US005695092A

United States Patent [19]
Schrandt

[11] Patent Number: 5,695,092
[45] Date of Patent: Dec. 9, 1997

[54] FLUID FLOW MEASURING SYSTEM

[75] Inventor: Henry M. Schrandt, Newtown, Pa.

[73] Assignee: BetzDearborn Inc., Trevose, Pa.

[21] Appl. No.: 582,268

[22] Filed: Jan. 3, 1996

[51] Int. Cl.$^6$ .................................................. B67B 7/00
[52] U.S. Cl. ........................ 222/1; 222/16; 222/36; 222/63; 73/168; 364/500
[58] Field of Search ...................... 222/1, 36, 37, 222/63, 55, 14, 16; 364/500, 502, 550, 571.01; 73/168, 223

[56] References Cited

U.S. PATENT DOCUMENTS

| | | | |
|---|---|---|---|
| 2,826,067 | 3/1958 | Braunlich | 73/168 |
| 4,322,972 | 4/1982 | Karjala | 73/168 |
| 4,331,262 | 5/1982 | Snyder et al. | 222/37 |
| 4,897,797 | 1/1990 | Free, Jr., et al. | 364/500 |

Primary Examiner—Gregory L. Huson
Attorney, Agent, or Firm—Alexander D. Ricci; Philip H. Von Neida

[57] ABSTRACT

In a treatment system for feeding a liquid from a tank having an outlet by a controllable pump operated cyclically, an automatic calibration/measuring system. The system is arranged for determining the volume of liquid pumped each cycle of the pump, a fluid flow measuring device and a controller coupled thereto. The fluid flow measuring device is in fluid communication with the tank. The fluid flow measuring device has a totalizer counter and batch measurement capability. The batch value in units of fluid volume or mass measurement is configured into the fluid flow measuring device. At the start of the batch, the fluid flow measuring device sends a ready signal to the controller that it is waiting to start the batch. The controller sends a start signal to the fluid flow measuring device that will initialize (zero reset) the totalizer counter and also tells the fluid flow measuring device that the batch has started and the totalizer to start the count of flow measurement. When the totalizer value equals the batch value, a batch complete signal is sent from the fluid flow measuring device to the controller. The batch complete signal defines a predetermined volume by which the controller measures and automatically calibrates this system. The controller in this system determines the actual number of cycles of operation of the pump required to pump the predetermined volume and if that number has deviated from a pre-established number. If so, the pump is controlled in response to the detected deviation.

7 Claims, 5 Drawing Sheets

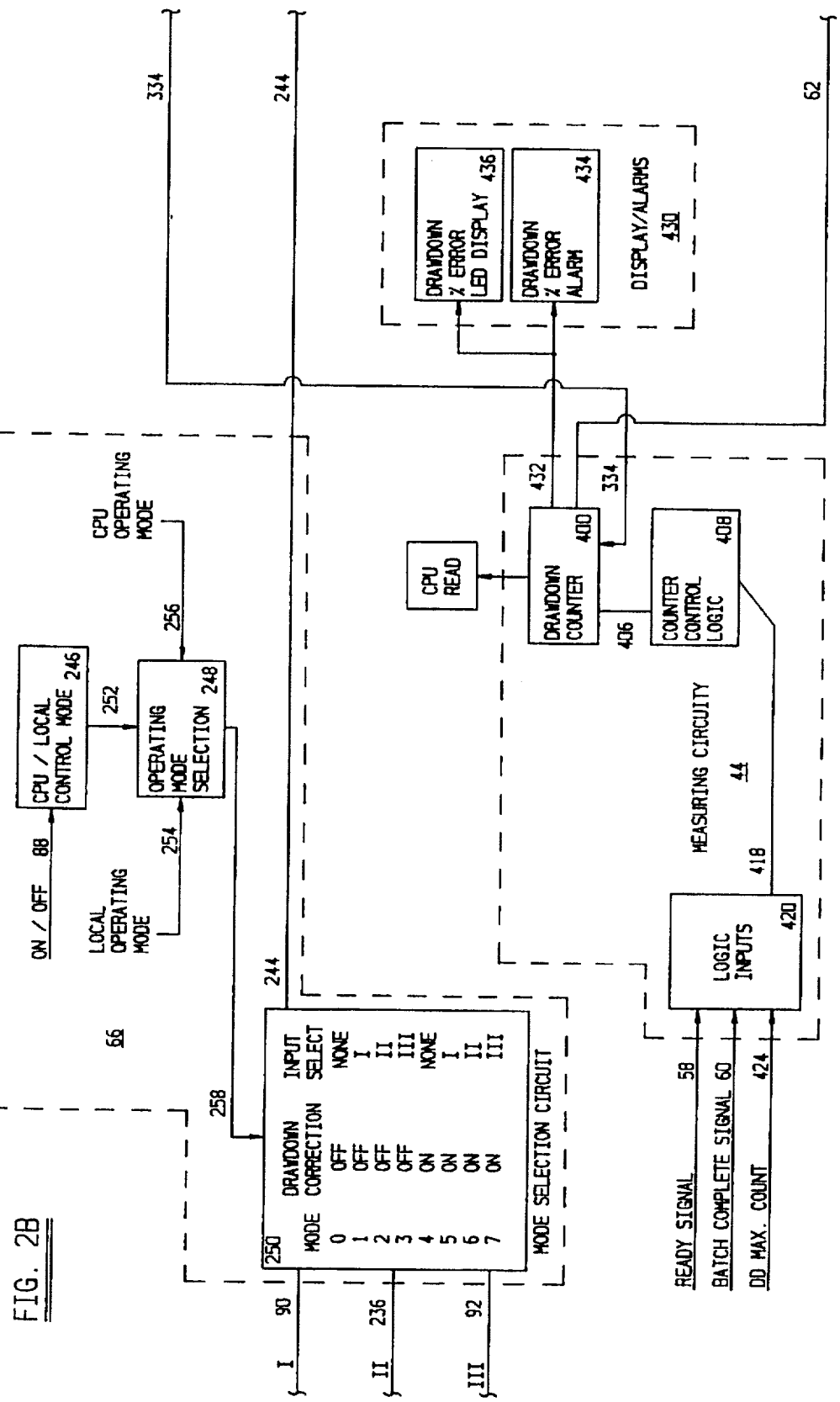

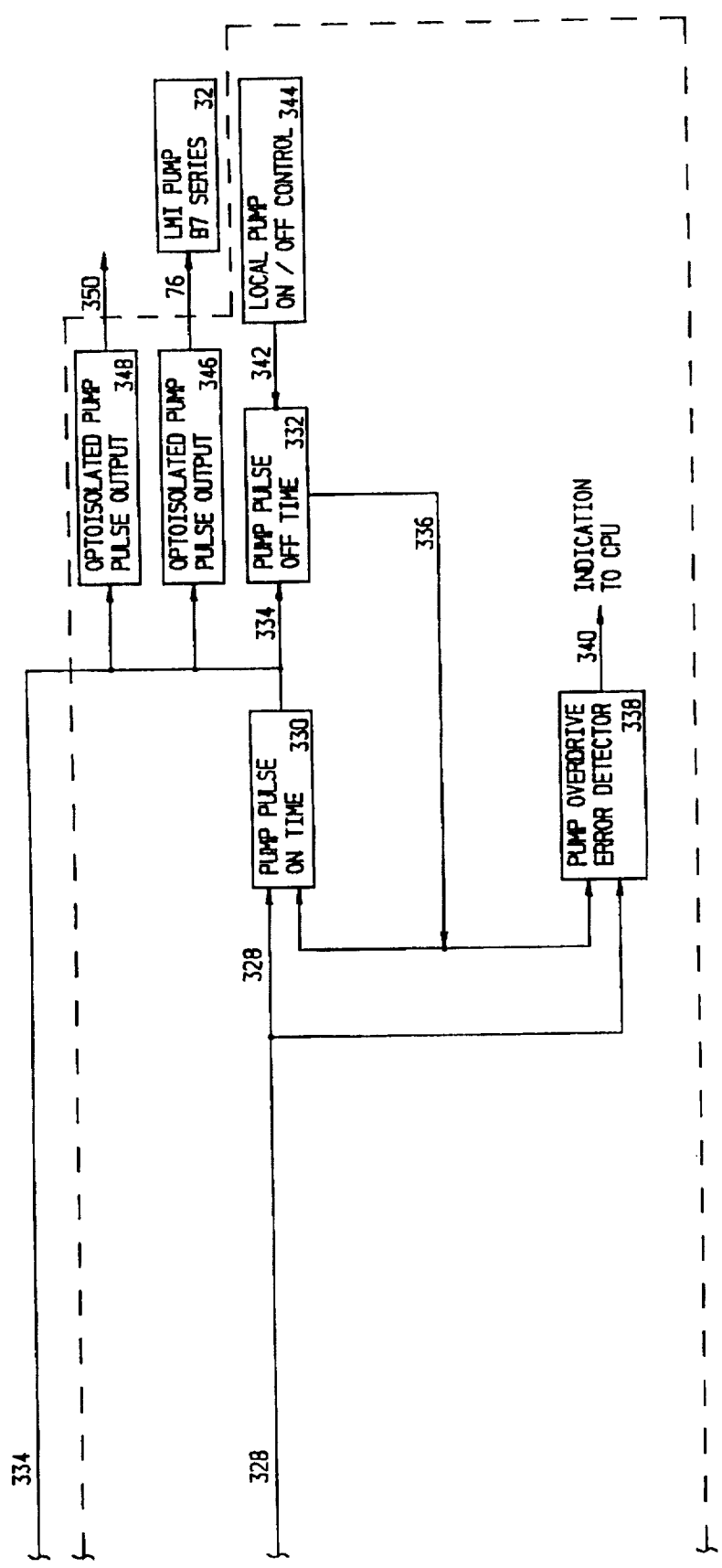

FLUID FLOW MEASURING SYSTEM

BACKGROUND OF THE INVENTION

This invention relates generally to chemical treatments systems and more particularly for systems for effecting calibrated, proportional control of a chemical treatment system.

In the preferred technique for treatment of water (or some other liquid) with another liquid, e.g., a chemical, the chemical feed rate has to be established and must vary dynamically with the flow of water or other liquid that is to be treated. The ratio of treatment liquid to treated liquid is typically defined in Parts Per Million (PPM) and should remain constant at all flow rates so that results and cost are optimized. To accomplish that end, the technique known as "proportional feed" is utilized. The achievement of "proportional feed" has been accomplished typically by the use of a proportional loop-controller having an associated pump and flowmeter.

In particular, the loop-controller system operates on the assumption that the chemical pump delivering the chemical from a storage tank is pumping the correct volume per stroke. Thus, tests must be run periodically to ensure that the system is working, is calibrated properly, and the tank or drum storing the testing chemical is not empty. While such operations are effective, they are nevertheless costly and labor intensive.

An alternative manner of effecting water treatment is to set the chemical pump feed rates at representative or average conditions, and thus not proportion the chemical feed rate to dynamic flow rates. Treating chemicals based on "average" conditions necessarily leads to overtreatment during some periods of time and undertreatment during other periods. Thus, while costs may not be excessive using this technique, the results frequently suffer. Yet another technique utilizes the feeding of excess chemical to handle the highest flow rate. As will be evident, this technique leads to overfeed during some conditions. Thus, while the results of this technique are usually acceptable, the costs can be excessive. In view of the foregoing, it is generally accepted that proportional feed is the optimum treatment technique for most applications. To accomplish true "proportional feed", the feed rate of the treatment chemical must not only be varied directly with the treated liquid's (e.g. water) flow rate, but must also take into account changes in the pump's stroke volume, that is, the volumetric output of the pump.

It has been a practice in the past to manually calibrate the pump, that is, interrupt the treatment operation to determine the stroke output of the pump and then manually adjust the pump in the event that its output has deviated from a predetermined value. Obviously, such a manual technique is less than optimum.

It has also been suggested in the patent literature to control or calibrate a pump automatically. For example, in U.S. Pat. No. 4,322,972 (Karjala) there is disclosed a method and apparatus for the verification and calibration of pumping rates in systems having a volumetric pump drawing fluid from a tank. An effluent valve is connected to the base of the tank and the valve is, in turn, connected to the base of a calibrated column which is relatively small in cross sectional area compared to the tank. The liquid is drawn from the column during normal pumping operation as well as during a calibration cycle. When it is desired to measure the flow, the column is isolated from the storage tank by closing the tank's effluent outlet valve. After a specific period of time, e.g., a minute or more, the decrease in liquid level within the column is measured and the flow rate calculated. The effluent valve is then reopened without having disturbed the system or having turned off the pump, allowing the same pump or flow rate to continue. At this point, the operator of the system can adjust the pump to provide a different rate. It is also stated that the calibration method and apparatus can be automated.

U.S. Pat. No. 4,331,262 (Snyder, et al.) discloses an automatic fluid dispenser including a pump and counter means to count the number of incremental volumes. The volume of fluid delivered in the selected number of increments is determined either automatically or by an observer in a calibration procedure. A computer is provided to compare the volume of fluid delivered with the number of increments required to deliver that volume and to determine a "calibrated value" therefrom. This value is stored in the memory of the computer. Calibration means are provided to issue a command to the computer to store the calibrated value and controller means are provided for causing the fluid dispenser to deliver a selected volume of fluid either as a single dose or repetitively.

U.S. Pat. No. 2,826,067 (Braunlich) discloses testing apparatus for determining the delivery rate of a pulse type pump. The apparatus includes a calibration cylinder connected to the outlet of the pump through a valve. A float is provided in the column to provide a signal indicative of the rate of descent of liquid in the column, thereby indicating the pump rate. This signal is provided to a recorder to provide an indication of variations in the pump rate or to stop the pump when the delivery rate is below or exceeds a preset level.

OBJECTS OF THE INVENTION

While all of the above systems are suitable for their intended purposes, all suffer from one or more drawbacks.

Accordingly, it is a general object of the instant invention to provide a system for automatically measuring the output of a pump used to introduce a treatment liquid into another liquid and which overcomes the disadvantages of the prior art.

It is a further object of the instant invention to provide in a liquid treatment system a calibration and measuring system for automatically calibrating and controlling a pump.

It is a further object of the instant invention to provide in a liquid treatment system a stand alone calibration/ measuring system for automatically controlling a pump in response to deviations in pump output.

It is yet a further object of this invention to provide a simple, yet effective, automated proportional feed system.

SUMMARY OF THE INVENTION

These and other objects of the instant invention are achieved by providing a calibration/measuring system for use in the liquid treatment system feeding a liquid into a line and utilizing a tank holding the liquid and having an outlet and a controllable pump coupled to the outlet for pumping the liquid from the tank into the line. The calibration/ measuring system determines the volume of the liquid pumped each cycle of operation of the pump and comprises measuring means and control means. The measuring means comprises a fluid flow measuring device coupled to the tank via the pump and the process fluid and is in fluid communication therewith. The fluid flow measuring device provides a ready signal that it is waiting to start a batch. After the controller receives the ready signal from the fluid flow measuring device, the controller sends a start signal to the fluid flow measuring device. The start signal resets the totalizer to zero and starts counting from zero. When the totalizer value equals the batch value, a batch complete signal from the fluid flow measuring device is sent to the controller. The batch value is entered into the fluid flow measuring device to define a predetermined volume. The control means establishes a predetermined number of cycles of operation of the pump to pump the predetermined volume through the fluid flow measuring device and for providing a batch complete signal indicative thereof. The measuring means is responsive to the ready and batch complete signals for determining the actual number of cycles of operation of the pump required to pump the predetermined volume and for providing a fourth signal indicative thereof. The control means compares the third and fourth signals to provide an output signal responsive thereto. When control or calibration of the pump is desired the output signal is coupled to the pump to control its operation.

DESCRIPTION OF THE DRAWINGS

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENT OF THE INVENTION

Figure 1:
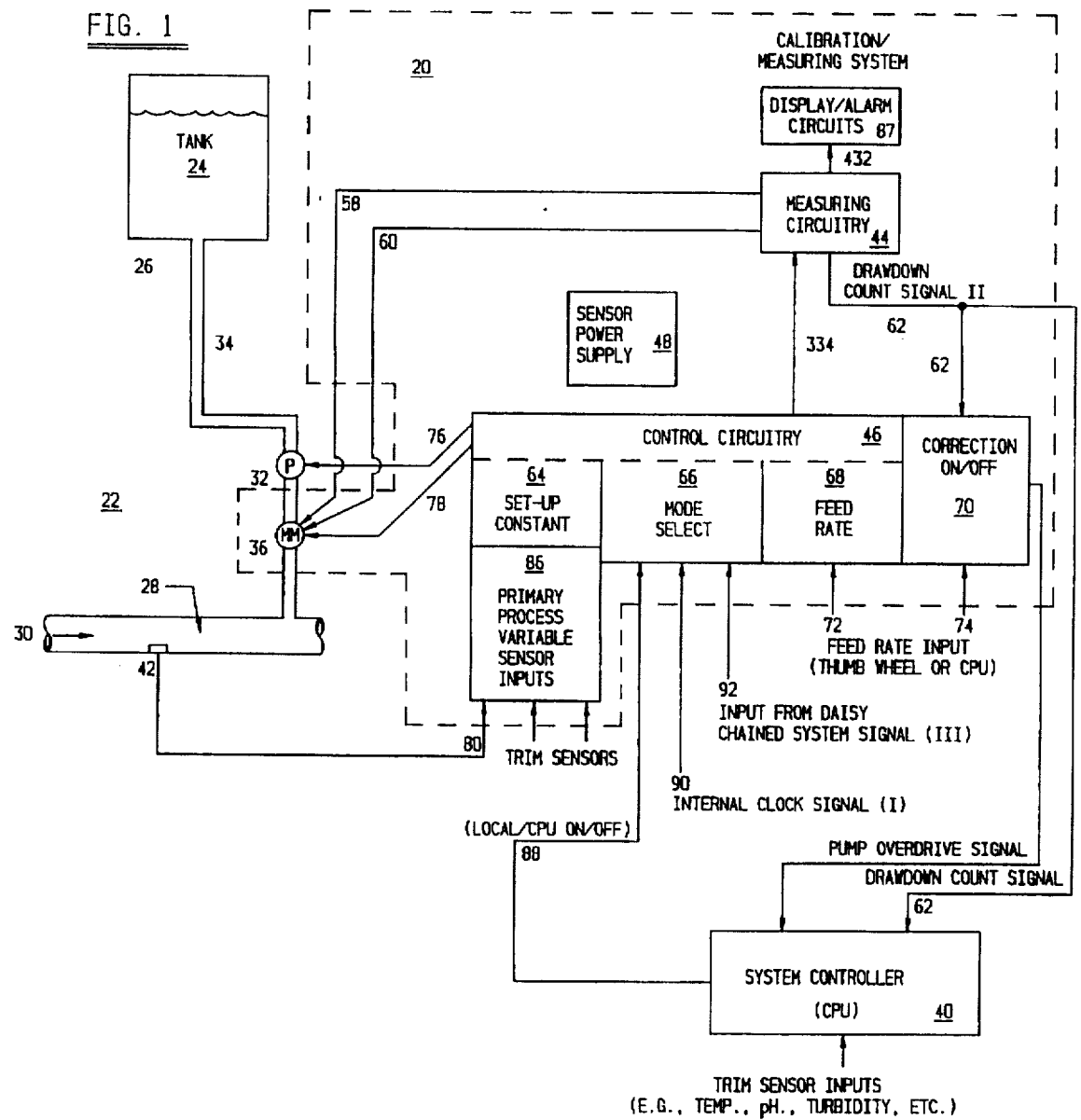
FIG. 1 is a schematic/functional block diagram showing the calibration/measuring system of this invention utilized in a conventional liquid treatment system.

Referring now to FIG. 1, there is shown at 20 a calibration/measuring system of the subject invention utilized in a liquid (e.g., water) treatment system 22. The liquid treatment system 22 in combination with the system 20 is arranged to effect the proportionate feeding of a treatment liquid 24 held in a storage tank or drum 26 into a line or conduit carrying the liquid 30 to be treated. The direction of flow of the liquid, e.g., water, through conduit 28 is shown by the arrow therein. The feeding of the treatment liquid 24 into the conduit is accomplished by the action of a controllable pump 32, such as a digitally pulsed pump. One particularly effective pump is sold by Liquid Metronics, Inc. as Model B. The inlet of the pump is connected in fluid communication to an outlet conduit 34 of the tank.

The conduit 28 can be of any particular diameter and is arranged to carry the liquid 30 therethrough to some location, for any desired purpose. The introduction of treatment liquid 24 into conduit 28 is effected by operating the pump to move the liquid through the fluid flow measuring device 36 into the conduit 28.

As can be seen, the liquid treatment system 22 also comprises a central (overall) system controller or CPU 40. This controller serves as the overall controller for system 22 and also controls the operation of the calibration/measuring system 20 when that system is in its CPU mode of operation. The calibration/measuring system 20 is also capable of operating in a manual or stand-alone mode.

As is conventional with proportional control liquid treatment systems a primary process variable sensor, such as a conventional paddle wheel flowmeter, is provided. This device is located in the conduit 28 to provide an electrical signal indicative of the rate of flow of the liquid to be treated therethrough. The flowmeter 42 is a conventional device, such as sold by Signet Scientific of El Monte, Calif. under the model designation MK515-PO. Other "variable" sensors for monitoring system variables, e.g., pH, turbidity, temperature, conductivity, etc., can be utilized in lieu of, or in addition to, the flowmeter 42.

As will be appreciated by those skilled in the art, the output of the pump 32, that is, the volume of liquid pumped per stroke or cycle thereof can vary over time. Accordingly, the calibration/measuring system 20 provides means for determining the pump's output and, if desired, controls the rate that the pump is operated (stroked) to maintain the desired volumetric output per unit of time. Thus, the calibration/measuring system 20 basically comprises measuring circuitry 44, control circuitry 46, and a fluid flow measuring device. The measuring means comprises a fluid flow measuring device which for purposes of the present invention can be defined as a device or series of devices which can measure a physical property of the liquid which flows through it. Examples of the fluid flow measuring device include but are not limited to a magnetic flowmeter which utilizes electrical means to detect a property of the liquid and an ultrasonic flowmeter which uses acoustic means to detect a property of the liquid. The fluid flow measuring device 36 cooperates with the measuring circuitry 44 to determine when a specific volume of treatment liquid has been pumped through the fluid flow measuring device 36 into the conduit in order to determine the number of pump strokes necessary to deliver that volume. That number or count is referred to as the "draw down" count and is used, when selected, by the control means to control or calibrate the pump. As can be seen in FIG. 1, the fluid flow measuring device 36 is located between the pump 32 conduit 28. The fluid flow measuring device 36 has the capability to measure volume and mass flows, as well as totalize measured flows. The fluid flow measuring device 36 has a batch capability to be configured to send a signal when the totalizer reaches the predetermined batch value, e.g., 100 milliliters, 158 grams, etc. The fluid flow measuring device is of conventional construction, such as K-Mag Magnetic Flowmeter, sold by Bailey-Fischer & Porter, of Warminster, Penna.

The fluid flow measuring device 36 is connected via an electrical conductor 58 sending a ready signal to the measuring means 44. Also, the fluid flow measuring device 36 is connected via an electrical conductor 60 sending a batch complete signal to the measuring means 44.

Details of the measuring circuitry 44 will be described later, suffice for now to state that it includes counting means responsive to the signals on lines 58 and 60 to count the number of strokes it take the pump to move the predetermined volume of liquid, into the line 28. The electrical signal from the measuring circuitry 44 indicative of that count is referred to as the "draw down count signal" and is provided from the measuring circuitry 44, via electrical conductor 62, to the control circuitry 46.

The control circuitry 46 controls the operation of the pump by providing driving pulses to it, with the frequency of those pulses being established by the control circuitry. In particular, the control circuitry is arranged when the system is in what is referred to as a "correction on" mode (to be described later) to automatically control the rate of pumping so that the pump delivers a predetermined volume of treatment liquid per unit of time, even if the volume of liquid delivered each stroke varies from a preestablished setting. The control circuitry 46 also establishes the desired feed rate of the pump, irrespective of whether or not the pump correction is desired, and is arranged to receive various manual or computer generated inputs, as well as the flowmeter signal (which is indicative of the rate of flow of liquid 30 through the conduit 28).

The control circuitry 46 basically comprises, set-up constant circuitry 64, mode select circuitry 66, feed rate establishment circuitry 70, correction on/off circuitry 68, and primary process variable sensor input circuitry 86.

The feed rate circuitry will be described in detail later. Suffice for now to state that a desired feed rate for the pump is provided as an input thereto. This feed rate can be either a manual signal provided via a thumb wheel switch or other adjustable means forming a part of the calibration/measuring system 20, or by a signal received from some other controller, such as the CPU 40. In the system 22 shown, the feed rate constitutes the primary control of the pump. The signal establishing the feed rate is provided, via electrical line 72, to the feed rate circuitry 68 of the control circuitry 96, as will be described later.

The control circuitry 46 is also arranged to receive a manual input signal, via electrical line 74, to the correction on/off circuitry to establish the local stroke volume setting for the pump, that is, the volume of liquid to be delivered per stroke (cycle) of the pump. The control circuitry 46 operates in response to the setting of the feed rate to control the operation of the pump by providing pump driving pulses, via line 76, to the pump.

The pump's output is continuously monitored by the calibration/measuring system 20 so that it can maintain a desired output, when desired. To that end, when the system 20 is in the "correction on" mode, the control circuitry utilizes the draw down count signal appearing on line 62 and the local stroke volume signal appearing on line 74 to adjust the frequency at which the pump is pulsed to compensate for any discrepancy between the local stroke volume signal and the draw down count signal.

The system 20 determines whether the pump is out of calibration during each draw down operation, that is, during each cycle of operation of the system when the liquid 24 is pumped through the fluid flow measuring device 36 into the conduit 28. Each "draw down" cycle is initiated by providing a signal, via electrical line 78, from the control circuitry 46 to the fluid flow measuring device 36. This signal resets the batch totalizer to zero and starts the next batch on fluid flow measuring device 36. Liquid 24 in the tank 26 flows through the pump 32, through the fluid flow measuring device 36 and into conduit 28. When the batch totalizer value equals the batch setpoint value on the fluid flow measuring device 36 a batch complete signal is sent via conductor 60 to measuring circuit 44. A second later, a ready signal is sent from the fluid flow measuring device 36 via conductor 58 to measuring circuit 44. By using the ready signal via line 58 and the subsequent batch complete signal via line 60, the measuring circuitry 44 provides the draw down count signal on line 62. This draw down count signal is used, when selected by the control circuitry 46, to adjust the pulse rate of the pump, to thereby calibrate or adjust the pump to the desired output for the desired feed rate and the measured liquid flow rate through the conduit 28. The details of this operation will be described later.

As shown in FIG. 1, the calibration/measuring system 20 also includes display/alarm circuitry 87. This circuitry provides visual signal(s) indicative of system conditions, e.g., percentage deviation of the pump, and/or audible alarm(s) upon the occurrence of certain predetermined conditions, to be described later.

The proportional feed of the liquid 24 into conduit 28 to maintain the desired ratio of liquid 24 to liquid 30 irrespective of changes in the flow rate of liquid 30 through conduit 28 is accomplished as follows. The signal from the paddle wheel flowmeter 42 or other input signal indicative of flow is provided, via line 80, and from the primary process variable input sensor circuitry 86, to the set-up constant circuitry 64 of the control means 46. That signal is utilized by the set-up constant circuitry, the associated mode select circuitry 66 and the feed rate circuitry 68 to control the pump output so that if the flow rate increases or decreases the pump output increases or decreases proportionately. This can be accomplished with or without pump calibration (i.e., adjustment to compensate for variations in stroke output). To that end, the correction on/off circuit 70 comes into play. Thus, if the correction on/off circuitry 70 is proportion to the change of flow in the conduit 28 as sensed by the paddle wheel flowmeter, irrespective of any deviation in the output from the pre-established local stroke volume setting of the pump. If, however, control of the pump to effect calibration is required, the control means 46 provides output signals to the pump which not only compensate for changes in the flow rate in the line (as determined by the flowmeter 42) but also compensate for changes in the pump stroke volume.

As can be seen in FIG. 1, the control means 46 of system 20 is arranged to receive various trim sensor inputs, such as electrical signals indicative of temperature, pH, turbidity, etc. existing in the system. These signals are provided to the analog input section of the CPU and are processed to establish the feed rate when the system 22 is under the control of the CPU 40. To that end the CPU 40 provides a local/CPU (on/off) signal, via line 88, to the mode select circuitry 66 so that the control means 46 can respond to automated control from the CPU 40 or to local control, that is, manual settings of the calibration/measuring system 20. The mode select circuitry will be described in detail later. Suffice for now to state that it is also arranged to receive an internal clock system, via line 90, or an input from another similar (multiple) calibration/measuring system 20 (not shown) which is daisy chained to the system 20 shown in FIG. 1. The later signal is provided to the mode select circuitry 66, via line 92.

Figure 2A:
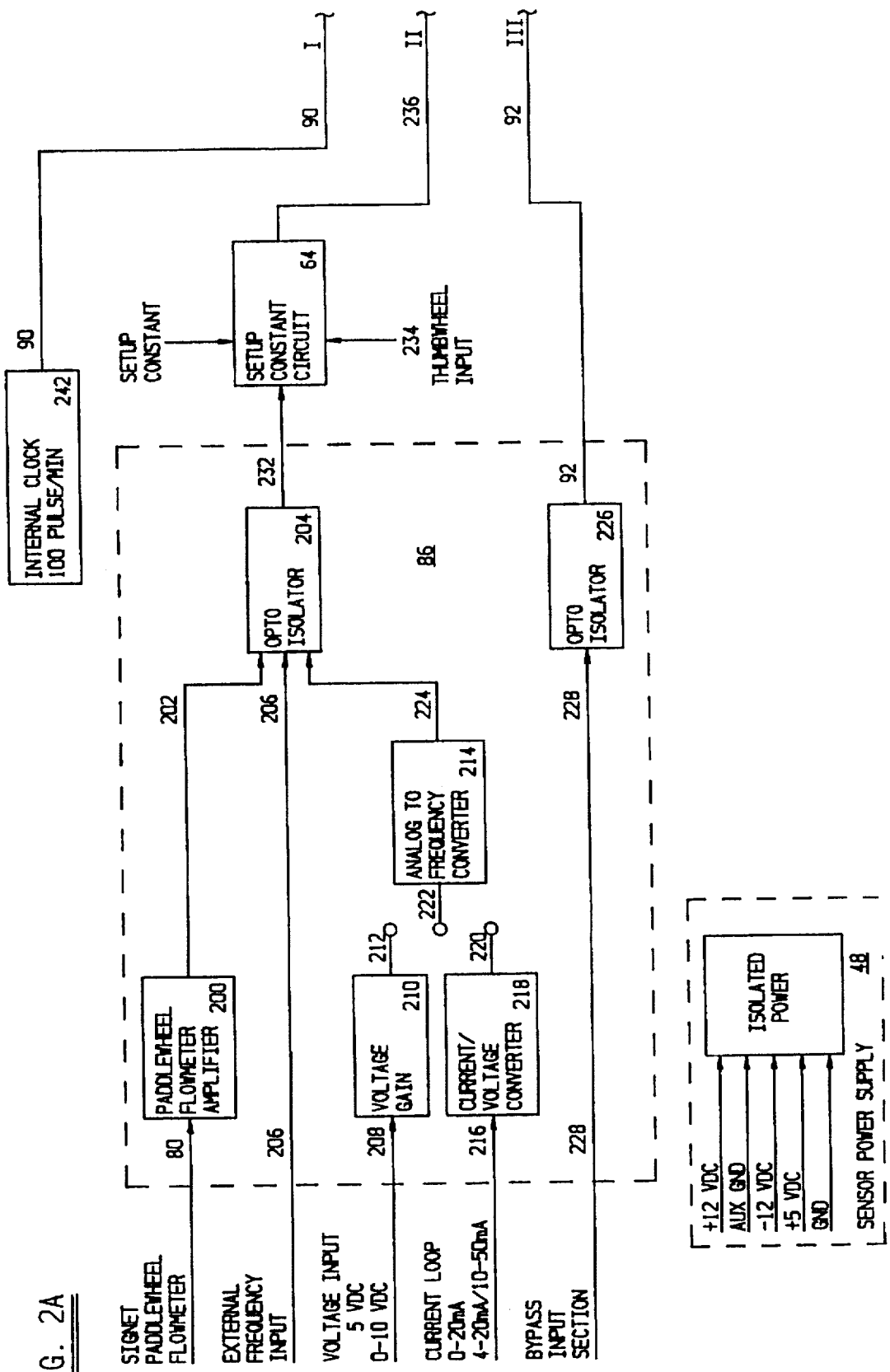
FIG. 2, consisting of FIGS. 2A, 2B, 2C and 2D, is a functional block diagram of the calibration/measuring system shown in FIG. 1.

Referring now to FIG. 2A, the components forming the primary process variable sensor input circuitry 86 will be described. As can be seen therein, that circuitry 86 includes a paddle wheel flowmeter amplifier 200 whose input is provided, via line 80, from the paddle wheel flowmeter 42. The flowmeter amplifier 200 basically consists of a comparator, such as a conventional LM311 comparator, sold by National Semiconductor. That device takes the sine wave input from the flowmeter appearing on line 80 and converts it into a square wave output signal. In particular, the amplifier detects when the sine wave passes a threshold value, e.g., 1 volt, and each time it does so, the comparator switches back and forth to produce the square wave output. The frequency of the square wave is indicative of flow in ft/sec. The square wave output is provided, via output line 202, into one input of a conventional, quad-optoisolator 204, such as sold by NEC under the model designation PS2401-4. The optoisolator 204 serves to optically isolate each of the input signals to each of its sections from its respective output signals so that there is no crosstalk therebetween. To that end, each section of the optoisolator includes an LED input that is turned on and off by a digital signal appearing on its associated input line. Internally, the LED is coupled to a phototransistor to turn it on and off at a frequency of the operation of the LED to provide an output signal on its associated output line which follows the input.

As mentioned in passing earlier, the calibration/measuring system 20 is arranged to receive other primary variable control input signals than that provided by the flowmeter 42. To that end, the system 22, and in particular its circuitry 86, is arranged to receive an external frequency input signal, such as can be provided by the contact closure of a water meter. This signal is provided, via line 206, into another input of the optoisolator 204. The signal appearing on line 206 can also be a test frequency input signal generated by some test equipment (not shown) in order to test the system 22. Other process variable sensor inputs can also be utilized by the system 20. Among the more popular process inputs to circuitry 86 are voltage input signals from 0 to 5 volts DC or 0 to 10 volts DC and conventional current loop signals in the range of 0–20 milliamps, 4–20 milliamps, or 10–50 milliamps.

Power for all of the input sensors associated with the primary process variable sensor input circuitry 86 is provided by the power supply 48. That supply basically consists of an isolated power supply component 230, whose various outputs are plus and minus 12 volts DC, plus 5 volts DC and ground. By providing the isolated power supply 230, any failure, e.g., short, or an input (trim) sensor, will not affect the internal circuitry of the system 22 itself.

The voltage input signals are provided, via line 208, to a voltage gain circuit 210 of circuitry 86. Circuit 210 acts as a buffer and consists of conventional, operational amplifier voltage followers. The amplified, buffered analog output signal from the voltage gain circuit 210 is provided onto output line 212. This line is arranged to be bridged by a jumper (not shown) to an analog-to-frequency converter circuit 214 (to be described later). The current loop primary process input signals are provided as an input on line 216 to a current/voltage converter circuit 218 forming a portion of the circuitry 86. The converter 218 also includes means to remove any offset that may have been provided in the current loop signals, e.g., 4–20 milliamps or 10–50 milliamps, so that all input are full scale signal. The converter is a conventional instrumentation amplifier, such as model AMP-01 made by Precision Monolithics, Inc., Santa Clara, Calif. The analog voltage output from the converter 218 is provided onto output line 220. That line is also arranged to be connected via the jumper as an input to the analog-to-frequency converter circuit 214. Thus, the input to that circuit is provided via line 222 or line 220, as the case may be, so that the analog signal indicative of either of the voltage input or the current loop input is provided to the analog-to-frequency converter 214. The converter 214 basically comprises a conventional device such as a model VFC100 voltage-to-frequency converter sold by Burr-Brown of Tucson, Ariz. and is arranged so that for an input of 0 to 10 volts it provides a linear output frequency of from 0 to 1.666 KHZ, with the frequency at the output line 224 being a function of the analog voltage signal appearing at its input. The output frequency signals of the circuit 214 are provided, via line 224, to the third input of the optoisolator 204. Thus, the optoisolator 204 either receives clock pulses which are indicative of the rate of flow of liquid through the conduit 28 (as determined by the flowmeter), external frequency inputs (such as provided by the contact closure off a water meter or some other input), or conventional voltage or current inputs (provided from other measuring or control devices). The primary process variable sensor input circuitry 86 also includes another optoisolator 226, which is a portion of the quad-optoisolator 204 and which receives a signal, via line 228, from a bypass input section (another system 20 daisy chained to the system 20 shown herein).

The signal appearing at the output of the optoisolator 204 is provided, via line 232, to the input of the set-up constant circuitry 64. The function of that circuit is to take the high frequency input and scale it down. Thus, the circuitry 64 basically comprises a frequency prescaler in the form of a simple divide-by-N circuit. In particular, the prescaler divides the 0 to 1.666 KHZ output frequency of the circuit 86 by any number from 3 to 999. The prescale factor is provided, via an input signal, appearing on line 234 from an adjustable BCD encoded rotary switch (not shown) or any other adjustable input device. The set-up number "N" which is used to divide the frequency appearing at input line 232 is selected as a function of the diameter of the conduit 28, the material making up the conduit, the full scale load for the system, as well as any other relevant input factors. Thus, one can configure the system 20 to provide a maximum pump output at a certain flow volume per time (GPM) through the particular conduit 28.

The prescaled frequency from the set-up constant circuit 66 is provided as an output signal, II, via line 236 to the mode select circuitry 66 (FIG. 2B of the control means 46). That circuitry also includes two other inputs, namely, the output signal, III, appearing on line 92 from the optoisolator 226, and a fixed clock frequency signal, I, e.g., 100 pulses per minute provided, via line 90, from an internal clock generator circuit 242. That latter circuit is provided so that if the user of the system 20 elects not to utilize any input sensors, the system could, based on the signal appearing on line 90, deliver a predetermined volume per time of liquid from the tank into the system to be treated.

The mode select circuitry 66 is arranged to select either the input signal I (to provide volume per unit time liquid application), or signal II (to proportion the liquid as a function of the primary process variables), or the signal III (to allow the user to cascade or daisy chain the output of another duplicate system 20). The daisy chained control is utilized when feeding plural different liquids into the conduit 28, with the ratio of the liquids to one another being predetermined, but all a function of the primary control input, e.g., all tracking the same flow rate.

To achieve the foregoing and as seen clearly in FIG. 2B, the mode select circuitry 66 establishes one of seven modes of operation. Those modes are identified functionally in the block diagram as modes 0, 1, 2, 3, 4, 5, 6 and 7. In mode 1, the input signal I appearing on line 90 is selected to appear at the output line 244 of the mode select circuitry. In addition, and during mode 1 operation, the draw down count is determined, it is not used to calibrate or control the pump. Thus, in mode 1 operation, the pulsing of the pump does not change to compensate for changes in stroke volume of the pump. In mode 2 operation, the frequency signal II appearing on line 236 is provided at the output line 244, again with the draw down correction being "off". So, too, in mode 3, the frequency signal III appearing on line 230 is provided at the output line 224 again with the draw down correction circuitry "off". When the system 22 is in modes 5, 6 or 7, the frequency signals I, II or III, appearing on lines 90, 236 and 92, respectively, are provided at the output line 244 of the mode select circuitry, but the draw down correction circuitry is "on". Thus, in these modes of operation the pump is controlled as a function of the draw down count, to thereby compensate for deviations in pump stroke output from desired values. In mode 0, none of the inputs are selected, and there is no draw down correction, while in mode 4, none of the inputs are selected (although there is draw down correction). Modes 0 and 4 are useful for system troubleshooting and automated self-diagnostics.

The mode select circuitry 66 is preferably implemented utilizing digital logic, e.g., a programmable logic array and associated integrated circuit chips. In particular, circuitry 66 basically comprises the components shown by the functional blocks 244, 248 and 250. The selection of which frequency signal appearing on the three input lines to the mode select circuitry is passed to the output line 244 thereof and is determined by the input signal appearing on control line 88 from the CPU 40. Thus, line 88 is connected as an input to the CPU/local control mode circuit 246. The signal appearing on line 88 comprises a signal indicating whether the system 22 is to operate under computer control from the CPU 40 or under local (manual) control. In manual control, control is established by various manual inputs to the system 22, e.g., the various thumb wheel inputs. In a preferred embodiment of the invention, the local control mode is established as a fallback or fail-safe mode of operation and occurs in the event of a failure of the CPU 40 or if the CPU relinquishes control. Local control can also be used at any time CPU control is not desired.

The CPU/local control mode circuit 246 provides an output signal indicative of the desired mode of operation, namely, whether CPU or local control. This signal is provided, via line 252, to the input of the operating mode selection circuit 248. That circuit basically comprises a multiplexer having a pair of input lines 254 and 256. Input line 254 carries a signal establishing a local operating mode, whereas line 256 carries a signal establishing a CPU operating mode. These signals are produced by means making up the mode control circuitry 66. In particular, the signals are created utilizing Binary Coded Decimal (BCD) switches and associated buffers. The two signals establishing the two modes are provided as inputs to the operating mode selector or multiplexer 248. Depending on the input signal appearing on line 252, the multiplexer 248 either provides the local operating mode signal or the CPU operating mode signal at its output line 258. This signal is utilized by the programmable array 250 of the mode select circuitry 66 to establish the desired mode of operation.

It should be pointed out at this juncture, that when the system is operating in the local mode, it can be overridden by the CPU operating mode so that control is effected pursuant to instructions from the CPU 40. Moreover, control of the CPU 40 itself can be effected from some other means, e.g., a remote or host computer (not shown). In any event, the system 20 is constructed so that if there is a problem in the CPU 40 and/or its associated circuitry, or if the CPU should go off line, the system 22 automatically falls back to operation in the local (manual) operating mode.

Figure 2C:
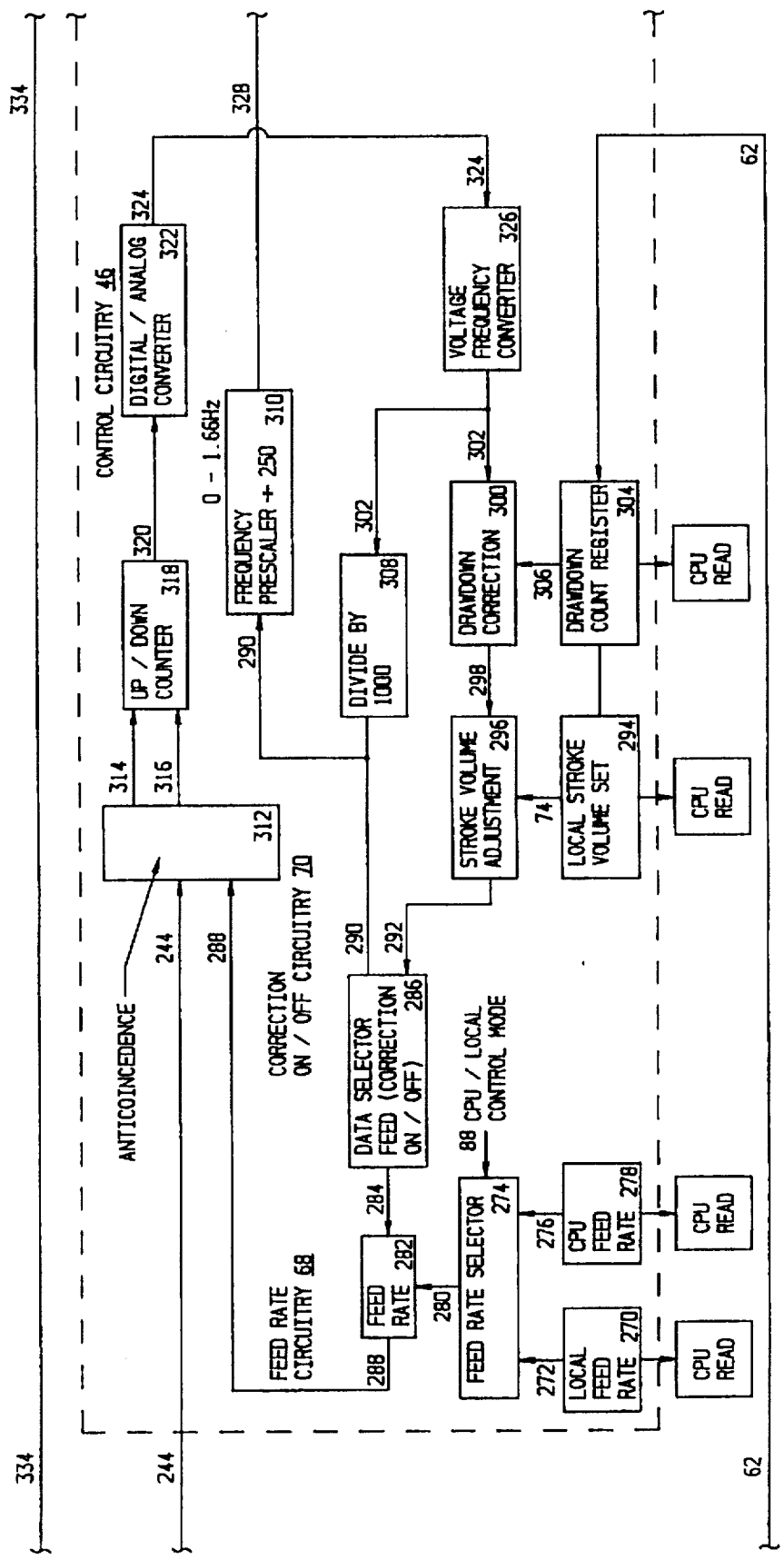

Referring now to FIGS. 2C, the details of the feed rate circuitry 68 will now be described. As can be seen, the feed rate circuitry 68 basically comprises a local feed rate input means 270. This means establishes the feed rate and preferably comprises a thumb wheel switch (not shown) which is set to the desired local feed rate of the pump. The signal from means 270 is provided, via output line 272, as one input to a feed rate selector 274. That selector basically comprises an 8-bit multiplexer arranged to receive two 8-bit inputs. Those inputs are provided, via either lines 272, from the local feed rate means 270, or via lines 276, from CPU feed rate means 278. Means 278 receives an 8-bit signal from the CPU 40 defining the desired CPU feed rate. A signal indicative of the local feed rate, as established by means 270, is provided back to the CPU 40. The actual selection of the particular feed rate to be provided by the feed rate circuitry 68 is established by the control signal appearing on the control line of the multiplexer 274. Thus, the control input of the feed rate selector is provided, via line 88, carrying the local/CPU (off/on) signal. In particular, when the system is in the local mode, the feed rate established by means 270 is provided via output line 280 to the control input to the feed rate circuit 282. That circuit basically comprises a divide-by-N circuit, with the "N" being established by the signal appearing on control line 280. The input to the divide-by-N circuit 282 is provided via line 284, with the signal appearing thereon consisting of a string of clock pulses provided at the output of a correction on/off (data selector) circuit 286. That circuit basically consists of a multiplexer and is arranged to receive clock pulse signals which have as their genesis the clock pulse signals appearing at the output line 244 of the mode select circuit 66 (as will be described later). The control signal appearing on line 280 basically comprises two, four-bit words combined into an 8-bit digital signal. One of the words is a Binary Coded Decimal (BCD) of the "units" digit and the other word is a Binary Coded Decimal of the "tens" digit. Therefore, the combined 8-bit digital signal on line 280 defines a feed rate from 0 to 99%. The clock pulses appearing on input line 284 are at a frequency which may or may not be adjusted, depending upon whether the calibration correction circuitry is "on" or "off". In any event, the feed rate circuitry divides the frequency of the clock pulses appearing on lines 284 by the integer defined by the signal appearing on line 280. Thus, for example, if a feed rate of 88% is required, the "88" signal appearing on control line 280 causes the divide-by-N circuit 282 to divide the input pulse train appearing on lines 284 by 88, whereupon for each 88 input pulses appearing on line 284 the output of the feed rate circuit, as provided on output line 288, is a single pulse. The feed rate can thus be thought of as the "set point" of the control system of this invention.

The correction on/off circuit 70 is operative to effect the pulsing of the pump in an uncalibrated state at whatever particular set point is established or to effect the calibrated control of the pump to achieve that set point value by taking into account any deviation between the pump stroke volume and the local pre-established stroke volume. In particular, if the system is operating correction "on" the circuitry 70 looks at the percent stroke volume at which the pump has been set to operate. By percent stroke volume, it is meant how much of a given volume the pump provides each stroke. The percent stroke volume is established by the local stroke volume setting means 294. That means, like means 270, preferably comprise a manually adjustable thumb wheel switch (not shown) or other adjustable device which provides a digital signal on line 74. The signal establishes the percent stroke volume for 30% to 100%. This stroke volume signal is also provided to the CPU 40 so that it can make use of that information, as required. The signal appearing on line 74, that is, the percentage stroke volume, is provided to a stroke volume adjustment circuit 296. That circuit is another divide-by-N circuit. Circuit 296 includes an input line 298, with the signal appearing on the input line comprising a stream of pulses at a controlled frequency and which is provided from a draw down correction circuit 300 (to be described later). The percentage stroke volume signal appearing on line 74 establishes the denominator (the "N") for the circuit 296, whereupon the frequency of the pulses appearing on line 298 is divided by the percentage stroke volume to produce an output pulse train of a lower frequency on line 292.

The draw down correction circuit 300 comprises yet another divide-by-N circuit which is provided with a pulse train input. The frequency of that input is controlled by other portions of the control means 46. In particular, the pulse train input to the draw down correction circuit 300 is provided via line 302. The draw down correction circuit 300 divides the pulse train input by the value of the signal appearing on control line 306. That signal is the draw down signal and is provided, via line 62, to a draw down register 304. The register stores the draw down count and makes it available, via line 306, to the draw down correction circuit 300. Thus, the signal appearing on line 306 establishes the "N" of circuit 300 so that the frequency of the pulse train appearing on line 302 is divided by the draw down count.

As will thus be appreciated, with the draw down count correction circuitry 70 "on", the clock pulse train provided on line 302 is first divided by the draw down count in the draw down correction circuit 300 and then divided by the local stroke volume setting in the stroke volume adjustment circuit 296. The divided frequency output signal is then provided, via line 292, to the correction on/off circuitry data selector 286. The data selector passes the divided signal, via line 284, to the feed rate divide-by-N circuit 282.

When the system 22 is operating with draw down correction "off" the pulses appearing on line 302 are provided to a divide-by-1000 circuit 308. The output of the divide-by-1000 circuit is provided, via line 290, to the second input of the multiplexer 286 and to a frequency prescaler circuit 310. The function of the divide-by-1000 circuit is to provide good resolution and speed of response for the system, while also enabling the changing of stroke volume by decades. The frequency prescaler 310 basically comprises a divide-by-250 circuit which serves to scale the clock pulses appearing on input line 290 down to a frequency range which can be utilized to drive the pump 32. In this connection, it should be remembered that the frequency of the pulse train signals appearing on line 302 from the voltage to frequency converter are in the range of 0 to 500 KHz. These signals, as will be described later, are provided to the divide-by-1000 circuit 308 so that its output appearing on line 290 are at a frequency in the range of 0 to 500 Hz. The frequency prescaler 310 further divides those signals down to a frequency in the range of 0 to 2 Hz to accord with the pump's range of operation of 0 to 120 pulses per minute.

The output signals appearing on line 328 of the prescaler are conditioned by duty cycle establishing circuitry, to be described later, in the control means 46 to drive the pump at the desired frequency and with pulses of the appropriate duty cycle.

The high frequency clock pulses appearing on line 302 are provided by the control means 44 in response to the receipt of the high frequency clock pulses appearing on output line 244 of the mode select circuitry. Those clock pulses are at a frequency which is utilized to synthesize or generate a second frequency which is close to or coincident therewith. Thus, as can be seen in FIG. 2C, the control means 46 includes anti-coincidence detection circuitry 312. That circuitry includes two inputs, namely, the process variable input signal appearing on line 244 from the mode select circuitry 66 and an internally synthesized signal appearing on line 288 from the output of the feed rate circuitry 68. These two signals are to be used by an up/down counter 318. Since that counter cannot count up and down simultaneously the anti-coincidence circuitry is arranged to monitor the signals on lines 244 and 288 to determine when they are coincident with each other. The circuit 312 basically comprises a 250 KHz, 2-phase clock made up of plural flip-flops and various small scale integrated circuits. These components are arranged to take the two input frequencies and shift them slightly in time so that no input pulse is missed. The signals from the circuitry 312 are provided, via lines 314 and 316, to the up/down counter circuit 318. That circuit basically comprises two conventional counters, such as models 74HC193 sold by National Semiconductor Corporation. As long as the two input frequencies appearing on line 244 and 68 are relatively equal, the count in the up/down counter remains relatively constant. The output of the counter is in the form of an 8-bit count of from 0 to 255 and is provided, via line 320, to a digital-to-analog converter 322. That converter is a conventional device, such as model DAC0800, sold by National Semiconductor Corp. and takes the 8-bit input signal and converts it into an analog voltage of from 0 to 10 VDC. The analog output of the digital-to-analog converter 322 is provided, via line 324, to the input of a voltage-to-frequency converter 326. That circuit is constructed similarly to the analog-to-frequency converter 214 and converts the analog signal into a frequency of 0 to 500 KHz which is provided on line 302.

Collectively, the up/down counter 318, the digital-to-analog converter 322 and the voltage-to-frequency converter 326 can be thought of as a count-frequency synthesizer. The count-frequency synthesizer circuitry and its associated components form what could be termed a "pump pulse synthesis" circuit. That circuit is a frequency-lock loop which automatically adjusts itself to make the frequencies of the two input signals on lines 244 and 288, respectively, equal. Operation of the pump pulse synthesis circuit is as follows: assuming that the closed loop control system is "balanced" (i.e., for a given process flow, the pump is being stroked at the appropriate frequency). If the flow rate through the conduit 28 increases, the up/down counter 318 begins to count up. This causes a higher frequency to be provided on lines 302, 290, 292, 284 and eventually 288. As long as the frequency of the signal on line 288 is not equal to the frequency of the signal on line 244 the counter 318 continues to count up. When the loop becomes balanced and the frequencies on the lines 244 and 288 become equal the pump will now be stroking at a higher frequency as is appropriate considering the increased flow. When the system is balanced and the feed rate is decreased, e.g., changed form 80 to 40, the frequency of the pulses on line 288 doubles (the feed rate is now divided by 40 instead of 80). Thus, the up/down counter 318 counts down. This causes a lower frequency to appear at lines 302, 290, 292, 284 and eventually 288. When the loop again becomes balanced, the frequency of the signals on line 302 will be half of what it originally was and the pump will be stroking at half the original frequency.

In order to drive the pump properly, as mentioned earlier, the control means 46 includes circuitry to condition or establish the duty cycle of the pulses provided to the pump. In a system utilizing an LMI, B7 series, pump such as is used in a preferred embodiment of this invention, the input requirements to the pump are a pulse of a minimum of 50 milliseconds duration (on time), with a time between pulses (off time) of a minimum of 100 milliseconds. Thus, as shown in FIG. 2D, the control means 46 includes a pump pulse on time circuit 330 and a pump pulse off time circuit 332. The pulse on time circuit receives one input from line 328 from the frequency prescaler 310. The output of the pump pulse on time circuit is provided, via line 334, to the input of the pump pulse off time circuit 332. Both circuits are conventional digital circuits which cooperate to create a pulse of particular duty cycle, and are preferably made up of a series of flip-flops and small integrated circuits.

The output of the pump pulse off time circuit 332 is provided via line 336, back as a second input to the pump pulse on time circuit 330. The line 336 also serves as one input to a pump overdrive error detector circuit 338. That circuit includes a second input provided via line 328 from the frequency prescaler 310. The pump overdrive detector basically comprises a single flipflop and small integrated circuits, whose output is provided via line 340 to the CPU 40. A second input to the pump pulse off time circuit 332 is provided, via line 342, from a local pump on/off control circuit 344. That circuit basically comprises small integrated circuits to allow manual input to enable or disable pump stroking. The pump pulse on time circuit serves to ensure that the pulse provided, via line 328, remains on for a predetermined period of time, whereas the pump pulse off time circuit 332 ensures that the time between pulses is at a predetermined minimum value. These two circuits are coupled back together in a feedback loop. Thus, the pulses appearing on line 334 are conditioned to be of the desire duty cycle for the pump. These pulses are also provided, via line 334, to first and second optoisolated pump pulse output circuits 346 and 348, respectively. The optoisolators 346 and 348 form respective portions of a quad-optoisolator like that described earlier. Thus, optoisolator 346 takes the input signal appearing on line 334 to provide a signal at its output line 76 which follows the input, but is isolated therefrom. This signal is provided by line 76 to drive the pump 32. The second optoisolated pump pulse output circuit 348 provides output signals which also echo the pulses at the pump. These signals are provided via line 350 to provide a visual indication of the pump strokes to the operator. These signals are also provided to a CPU counter (not shown) for the purpose of counting pump pulses per minute and calculating the volume pumped in gallons per minute.

The pump overdrive detector circuit 360 basically comprises a flipflop and small integrated circuits. The function of the overdrive detector circuit is to determine if the system is attempting to drive the pump in excess of its capabilities and to provide a signal to the CPU 40 upon the occurrence of such condition. In particular, the signal appearing on line 340 which indicates an overdrive condition is provided to set a bit in a status register (not shown) in the CPU 40. The CPU can then take appropriate action, e.g., back down on the feed rate to bring the pump back into its operating range. The signal appearing on line 340 is also used to provide an indicator to operating personnel of the overdrive (alarm) condition.

The local pump on/off control circuit 344 basically comprises an arrangement of small integrated circuits. Its function is to disable the pump, when desired, by providing an appropriate signal on line 342 to the pump pulse off time circuit 332. Thus, the circuit 344 serves as an interlock for the pump.

As can be seen in FIGS. 2B, 2C and 2D, line 334 is connected to the measuring circuitry 44. Thus, line 334 carries pulses which echo (indicate) the stroking of the pump so that the measuring circuitry can utilize this information in effecting its various operations.

As can be seen in FIG. 2B, the measuring means 44 includes plural counters which receive counts indicative of the draw down as determined by the system 20. The draw down counter 400 includes one input connected to line 334 carrying pulses echoing the operation of the pump. The draw down counter 400 also includes a second input coupled to appropriate counter control logic circuitry. Thus, draw down counter 400 includes a line 406 coupled to the output of a counter control logic circuit 408. Control logic circuit 408 is connected to bus 418. The bus 418 is itself connected to the output of a logic input circuit 420. That circuit is an optoisolated buffer such as sold by NEC Electronics, Inc. (NEC) under the model designation PS2401-4, and has six inputs. Those inputs are the ready signal input line 58, the batch complete signal input line 60, a line 424 which provides a signal indicative of the draw down maximum count. The control logic circuit 408 basically comprises synchronous sampling registers Programmable Logic Arrays and flip-flops. The circuit 408 serves to control its associated counters, e.g., reset the counter on power-up, start the counter, stop the counter, etc. Once a counter stops counting, its count is transferred into an associated storage register (not shown) and the counter is cleared so that it is ready to start counting again.

The output of the draw down counter is provided, via line 62, to the correction on/off circuitry 70. In addition, the draw down count is also provided to display and alarm circuitry 87, via line 432. That circuitry as noted earlier provides indications of system conditions and any alarm status. Thus, line 432 serves as one input to the draw down percent error alarm circuit 434 and as an input to a draw down percent error LED display circuit 436. The LED display circuit consists of a series of colored LEDs that are mounted on a panel of system 20 and arranged as a "null" meter. The middle of the display is established to be 0% error, while the colored LEDs above and below indicate plus and minus error in the draw down. As will be appreciated by those skilled in the art, when the display displays a plus percent error that indicates that the pump is pumping more than what is expected and its pulse rate has to be slowed down. Conversely, a minus percent error means the pump is pumping less than expected and has to be speeded up if precise calibration is desired. It should be remembered that the system need not control the pump to calibrate it upon a deviation from a desired stroke setting. In such a case, while the display circuit 436 will display the deviation, the system 20 will not take action to correct or compensate for the deviation.

The draw down percent error alarm circuit 434 provides an alarm signal which can be sent remotely to a control room or to some other site to provide a signal any time that the draw down error is outside of a predetermined range (window), e.g., plus or minus 15% error in draw down provides an alarm. In the preferred embodiment of this invention, there are four alarm bands or ranges for actuating the draw down percentage alarm. Thus, the alarm circuit 434 includes four jumper selectable connections (not shown) to establish alarm bands at plus or minus 15%, plus or minus 20%, plus or minus 25% or plus or minus 30%.

The input appearing on line 424 to the logic circuit 420 is provided by counter 400. This counter is sized so that its maximum count should not be reached before it is cleared. Thus, the signal appearing on line 424 indicates if a count has reached the maximum before being cleared and which would indicate some error. This signal is provided, via the bus 418, to the counter control logic circuit associated with the control of its operation.

As will be appreciated by those skilled in the art, the subject calibration/measurement system is eminently suitable as a proportional controller for a chemical pump and has application in nearly all types of chemical feed, for mill water, polymer feed, boiler chemicals, cooling chemicals, process chemicals and even production of chemicals. The system offers significant advantages over prior art systems in that it checks chemical delivery and automatically corrects for any discrepancy between the feed rates set and the actual delivery when operating in the correction "on" mode. Moreover, the system is a true proportional controller of wide utility in that it can effect ratio control by taking a variety of input signals to accommodate a variety of conventional meters, such as paddle wheel pulse meters, contact closure, 0 to 5 volts, 4–20 milliamps, etc. In its most common mode, as described herein, the system is used to pump a liquid chemical into a conduit carrying water. Thus, the ratio control is provided based on water flow rate. However, the system can ratio to time, or to virtually any other instrument control. Thus, the system pulses the pump for each stroke. The pulses are in proportion to the set point of the water meter rate. By making a direct conversion to pulses to drive the pump instead of outputting an analog signal, e.g., 4–20 milliamps, the system can use a less expensive pump and change proportional feed rates immediately without any stoppage for a sampling period. As also described above, the system automatically effects pump verification, and if desired, pump calibration (compensation) with such calibration being capable of being accomplished continuously. Pump malfunction can be detected within a short period of time, e.g., two minutes of failure.

To accomplish the foregoing, the system draws the treatment liquid through the fluid flow measuring device 36 to count the number of strokes needed to complete a batch on the fluid flow measuring device. The batch setpoint value is the known volume of chemical therefrom. The volume divided by the number of strokes equals the volume of each stroke. If the desired stroke volume is determined to be low, the pump pulse rate is increased proportionately. The result is delivery of the exact amount of treatment liquid required. If the pump is unable to make up the deficiency, e.g., the tank has no chemicals in it, the system will provide an alarm.

As a result of the foregoing, the subject invention achieves precise feed rate, proportional to flow and acquires confirmation of exact delivery. All of these features are achieved without the use of any computer in system 20. By adding a very simple computer to the treatment system, e.g., use of a computer like CPU 40 in the system 22, all of the data produced by the calibration/measuring system 20 of this invention can be provided to it for storage and/or remotely communication. With the use of a computer in the system 22, complex control algorithms (based on temperature, corrosion rates, etc.) can be used to set the feed rate; or the feed rate can be manually or automatically changed, e.g., via telephone modem. The new rate will thus override the rate set by the measurement/calibration system 20. In the event of a failure, the system 20 simply operates at the rate set manually thereby.

Without further elaboration the foregoing will so fully illustrate my invention that others may, by applying current or future knowledge, adopt the same for use under various conditions of service.

What is claimed as the invention is:

1. In a treatment system for pumping a liquid into receiving means, said treatment system comprising tank means holding said liquid and having an outlet and controllable pump means having an inlet for cyclically pumping said liquid into said line receiving means, the improvement comprising a calibration/measuring system for determining the volume of said liquid pumped each cycle of operation by said pump means and for controlling the operation of said pump means in response thereto, said calibration/measuring system comprising pump means connected to the outlet of said tank means and in fluid communication therewith for receiving said liquid from said tank means, said calibration/measuring system comprising fluid flow measuring means connected to the outlet of said pump means and in fluid connection therewith for receiving said liquid from said tank means, measuring means, and control means, said tank means having an outlet connected to the inlet of said pump means and in fluid communication therewith to serve as the supply of said liquid to said pump means, said fluid flow measuring means having a totalizer counter and batch measurement means providing a first ready signal when a batch can start and providing a third batch complete signal when the totalizer counter batch value equals the predetermined batch setpoint value, said batch setpoint value defining a first predetermined volume, said control means establishing a predetermined number of cycles of operation of said pump means to pump said first predetermined volume through said fluid flow measuring means into said receiving means and for providing a second start signal indicative thereof and resetting (initializing) and starting said totalizer counter, said measuring means responsive to said ready and batch complete signals for determining the actual number of cycles of said pump means required to pump said predetermined volume into said receiving means and for providing a fourth signal indicative thereof, said control means comparing said ready and fourth signals and providing an output signal responsive thereto, said pump means being controlled in response to said output signal.

2. The calibration/measuring system of claim 1 wherein said treatment system includes flow rate sensing means for determining the flow rate of said liquid in said line and for providing a seventh signal indicative thereof, said calibration/measuring system operating in response to said seventh signal to provide said output signal to control said pump means in response to changes in the flow rate of said liquid in said line.

3. The calibration/measuring system of claim 1 additionally comprising display means operatively coupled to said fourth signal for providing a display in response thereto.

4. The calibration/measuring system of claim 3 additionally comprising alarm means operatively coupled to said fourth signal for providing an alarm in response thereto.

5. The method of claim 1 wherein said fluid flow measuring means are magnetic flowmeter means.

6. A method for calibrating the operation of a pump in a treatment system while said pump pumps a liquid into liquid receiving means in said treatment system, said treatment system comprising said pump, controller means, and tank means holding said liquid and having an outlet, said pump having an inlet and being controllable for pumping said liquid into said receiving means, said pump operating cyclically in response to said controller means, said method comprising providing fluid flow measuring means connected to said outlet of said pump means and in fluid communication therewith for receiving said liquid from said tank means, said fluid flow measuring means having an inlet, said pump having an outlet connected to said inlet of said fluid flow measuring means for pumping liquid from said tank means into said receiving means, selectively providing said liquid from said tank means to said fluid flow measuring means via a pump, automatically providing a ready signal when a batch is ready to start, automatically providing a batch complete signal when the volume of liquid passes through said fluid flow measuring means and the batch totalizer value equals batch setpoint value, establishing a predetermined number of cycles of operation of said pump to pump said batch setpoint value volume into said receiving means and providing a third signal indicative thereof, determining the actual number of cycles of operation of said pump necessary to pump said batch setpoint value volume into said receiving means in automatic response to said ready and batch complete signals and providing a fourth signal indicative thereof, and comparing said third and fourth signals and automatically providing an output signal responsive thereto, said output signal serving to control said pump.

7. The method of claim 6 wherein said fluid flow measuring means are magnetic flowmeter means.

* * * * *